US008369567B1

(12) United States Patent
Buck et al.

(10) Patent No.: US 8,369,567 B1
(45) Date of Patent: Feb. 5, 2013

(54) METHOD FOR DETECTING AND MAPPING FIRES USING FEATURES EXTRACTED FROM OVERHEAD IMAGERY

(75) Inventors: Heidi Buck, San Diego, CA (US);
Bryan Bagnall, San Diego, CA (US);
Elan Sharghi, San Diego, CA (US);
John Stastny, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 456 days.

(21) Appl. No.: 12/777,349

(22) Filed: May 11, 2010

(51) Int. Cl.
*G06K 9/00* (2006.01)

(52) U.S. Cl. .......................... 382/100; 382/165; 382/181

(58) Field of Classification Search .................. 382/100, 382/165, 181; 340/578
See application file for complete search history.

(56) References Cited

U.S. PATENT DOCUMENTS

| | | | | |
|---|---|---|---|---|
| 5,557,260 | A | * | 9/1996 | Legaz et al. .................. 340/578 |
| 5,719,949 | A | * | 2/1998 | Koeln et al. .................. 382/113 |
| 5,734,335 | A | | 3/1998 | Brogi |
| 5,832,187 | A | * | 11/1998 | Pedersen et al. ................. 706/45 |
| 5,850,182 | A | * | 12/1998 | Schuler ......................... 340/578 |
| 6,184,792 | B1 | * | 2/2001 | Privalov et al. ................. 340/578 |
| 6,556,981 | B2 | | 4/2003 | Pedersen |
| 7,337,156 | B2 | | 2/2008 | Wippich |
| 7,456,749 | B2 | | 11/2008 | Anderson |
| 2009/0262978 | A1 | * | 10/2009 | Zavagli et al. ................. 382/103 |

FOREIGN PATENT DOCUMENTS

WO   WO 2008012370 A1 *   1/2008

OTHER PUBLICATIONS

Abuelgasim et al.—"Day and Night-time Active Fire Detection over North America using NOAA-16 AVHRR Data." 2002 IEEE International Geoscience and Remote Sensing Symposium, vol. 3, 2002, pp. 1489-1491.*
Kalpoma et al. "A New Approach for More Effective Fire Detection Method Using NOAA AVHRR images." Proceedings of the 2005 IEEE International Geoscience and Remote Sensing Symposium, vol. 8, Jul. 25, 2005, pp. 5714-5716.*
Fujiwara et al. "Forest Fire Detection in 2001 Using Three-Dimensional Histogram." 2002 IEEE International Geoscience and Remote Sensing Symposium, vol. 4, 2002, pp. 2057-2059.*

* cited by examiner

*Primary Examiner* — Jon Chang
(74) *Attorney, Agent, or Firm* — Kyle Eppele; Stephen E. Baldwin (57) ABSTRACT

A method for automatically detecting and mapping fires based on information extracted from commercial overhead EO/IR imagery, creating geo-referenced files which can be opened in most common geographic information system (GIS) software packages. The method creates a shape-file (*.shp & *.shx) and a Google Earth file (*.kmz) which contain the outlines of the areas from the image being processed with active fire in them, which types of files are typically very small compared to the size of the image file being processed. The method utilizes algorithms designed to process information contained in multi-spectral electro-optical imagery to classify pixels as 'fire' or 'non-fire'. The method also has the ability to identify the approximate length, width, and area of the fires detected.

13 Claims, 13 Drawing Sheets

FIG. 1

| Company | Imagers |
|---|---|
| SPOT Image | SPOT-4 |
| SPOT Image | SPOT-5 |
| DigitalGlobe | QuickBird |
| DigitalGlobe | WorldView-2 |
| GeoEye | IKONOS |
| GeoEye | OrbView-2 |
| GeoEye | GeoEye-1 |

FIGURE 2: Table of currently available commercial satellite imagery providers and imager names.

3A

3B

3C

3D

FIGURE 3: Layers of a multi-spectral image

FIGURE 4: Searching for fire in a multi-spectral image

FIGURE 5: The spectra of a fire pixel

FIGURE 6: Spectral signature of pixels that contain fire behind white smoke

FIGURE 7: Parallelepiped region for fire behind white smoke

FIGURE 8: Classification Map (B, G, R, NIR)

FIGURE 9: Classification Map (G, R, NIR, SWIR)

FIGURE 10: Pixel-by-Pixel Classification (G, R, NIR, SWIR)

FIGURE 11: Pixel-by-Pixel Classification with Lowered Thresholds (G, R, NIR, SWIR)

FIGURE 12: Smoke Mask Algorithm Flow Chart

METHOD FOR DETECTING AND MAPPING FIRES USING FEATURES EXTRACTED FROM OVERHEAD IMAGERY

FEDERALLY-SPONSORED RESEARCH AND DEVELOPMENT

This invention (Navy Case No. 100162) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

CROSS-REFERENCE TO RELATED APPLICATIONS

The present application is related to co-pending application entitled SHIP DETECTION SYSTEM AND METHOD FROM OVERHEAD IMAGES, Ser. No. 12/197,421, filed Aug. 25, 2008 (NC 099,165), assigned to the same assignee as the present application, and the details of which are hereby incorporated by reference.

BACKGROUND OF THE INVENTION

Currently, automated and manual systems for classifying and mapping fire from overhead imagery do exist. The mapping of fires at the resolution that this invention achieves is currently done manually. This process requires a human analyst trained to identify fire from overhead imagery to scour the image looking for regions which appear to contain fire. Once areas that are believed to contain fire are noted, the analyst must create images and/or other files denoting their analysis. This process can be very time consuming, especially for images which cover large areas of land that the image analyst must observe. With this method, classification can only be completed by highly skilled analysts. In emergency situations or when there are many images which need to be analyzed, an analyst may be unable to accurately analyze all of the images on the timescale that the mission requires.

Other methods of automated fire classification from overhead EO/IR (Electro-Optical/Infra-Red) satellite imagery generally use lower resolution images. For example, the Moderate Resolution Imaging Spectroradiometer (MODIS) fire feed only achieves a one kilometer resolution. The low resolutions of the current automated classification systems are disadvantageous because individual fires may be much smaller than one kilometer. This means that a very large fire which actually does cover a one kilometer square has the possibility of appearing the same as a very small fire and vice versa. Accurate estimates of the area of the fire can be crucial information when used for combating the fire. The current methods have the possibility of masking the extent of the fire because of their low resolution.

Figure 1:
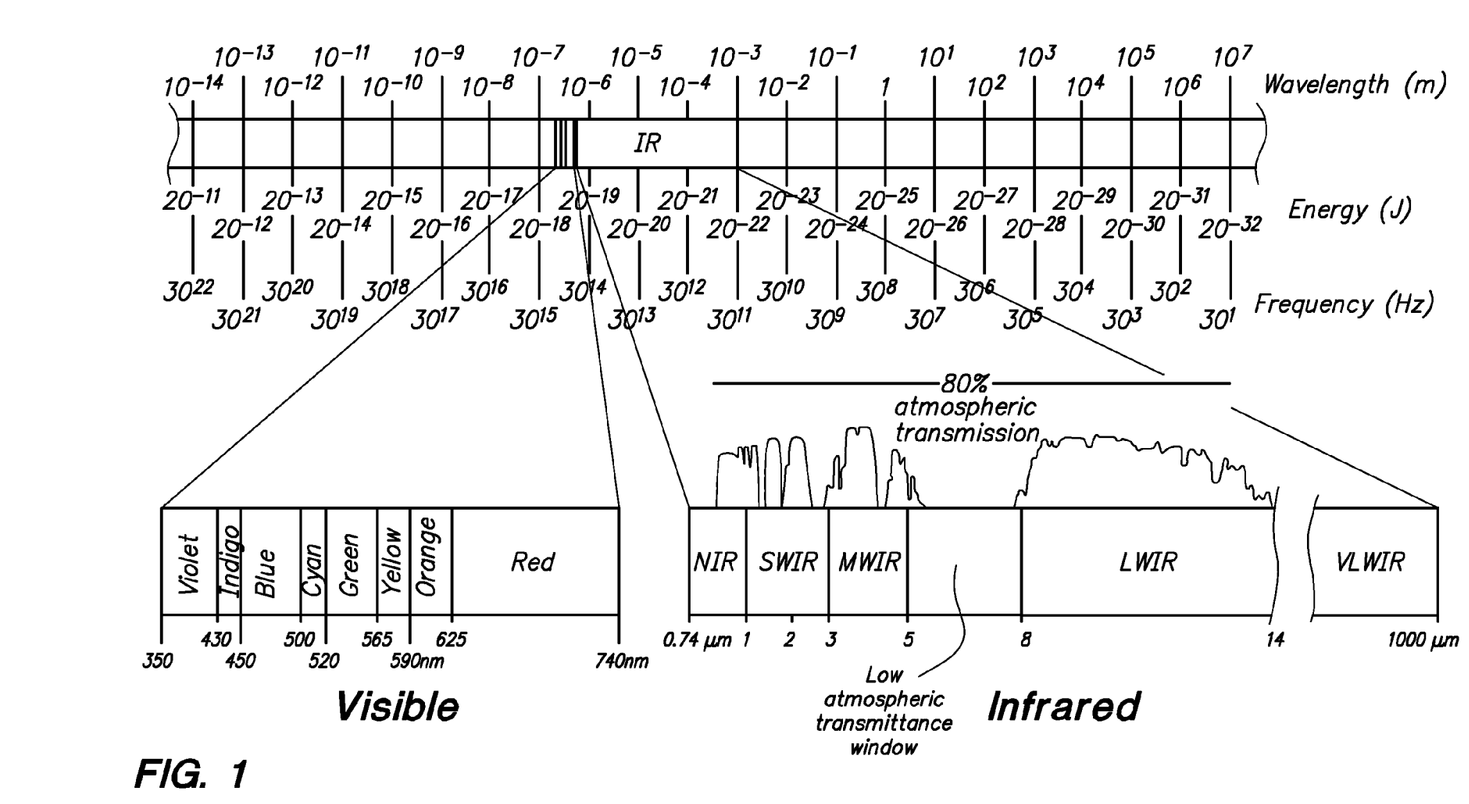
FIG. 1 shows a depiction of the electromagnetic spectrum with labels for visible and infrared regions

The present invention also differs from the MODIS fire feed in the regions of the electromagnetic spectrum that it uses to identify fires. The MODIS sensors are capable of sensing electromagnetic radiation at 3.9 and 11 micrometers. From FIG. 1 we can see that these are in the mid-wave infrared (MWIR) and long-wave infrared (LWIR) regions of the spectrum. Radiation that we feel as heat typically comes from these regions of the spectrum. The present invention detects fires by only using information contained in the visible and near-infrared (NIR) and/or short-wave infrared (SWIR) regions of the spectrum. The fact that the NIR and SWIR bands are not true thermal bands makes the detection of fires much more difficult.

Some methods are limited by the size of the files that they create as an output of their mapping algorithm. Bandwidth can be an important factor when trying to stream important information to its destination. Some of the current methods create classification maps which can be proportional in size to the original image. To transmit these files can require a significant amount of bandwidth and time. The large file sizes can become especially restrictive when dealing with mobile wireless technologies such as those used by first responders.

SUMMARY

The present invention is related to a method for automatically detecting and mapping fires based on information extracted from commercial overhead EO/IR imagery, creating geo-referenced files which can be opened in most common geographic information system (GIS) software packages. The method creates a shapefile (*.shp & *.shx) and a Google Earth file (*.kmz) which contain the outlines of the areas from the image being processed with active fire in them, which types of files are typically very small compared to the size of the image file being processed. The method utilizes algorithms designed to process information contained in multi-spectral electro-optical imagery to classify pixels as 'fire' or 'non-fire'. The method also has the ability to identify the approximate length, width, and area of the fires detected.

BRIEF DESCRIPTION OF THE DRAWINGS

Throughout the several views, like elements are referenced using like references.

DETAILED DESCRIPTION OF EMBODIMENTS

Figure 2:
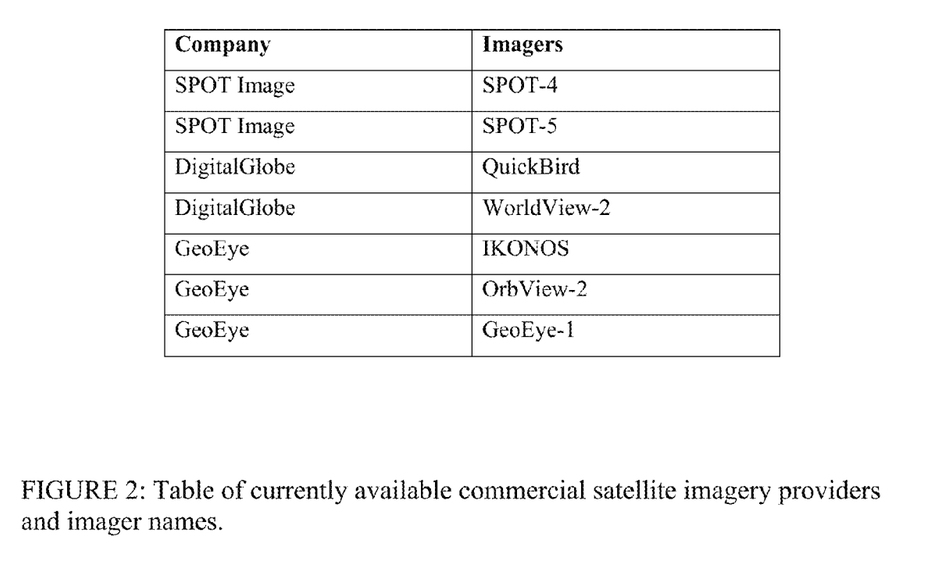
FIG. 2 shows a table of currently available commercial satellite imagery providers and imager names.

One purpose of the present invention is to automatically detect and map fires based on information extracted from commercial overhead EO/IR imagery. A table of commercial imagers and the companies that operate them can be found in FIG. 2. Suitable sets of high resolution images with multi-spectral imagery (MSI) are commercially available from various satellite companies shown in FIG. 2, as follows:

DigitalGlobe Quickbird, with 2.4 m resolution (color) with 4 bands MSI

DigitaGlobe WorldView-2 with 1.4 m resolution (color) with 8 bands MSI

SPOT Image SPOT-4 with 20 m resolution (color) with 4 bands MSI SPOT Image SPOT-5 with 5 m, 10 m resolution (color) with 4 bands MSI GeoEye OrbView-2 with 1.65 m resolution (color) with 4 bands MSI GeoEye GeoEye-1 with 1.65 m resolution (color) with 4 bands MSI GeoEye IKONOS with 3.2 m resolution (color) with 4 bands MSI The invention has three methods of interacting with the high resolution imagery as set forth above. There is a fully-automated method, a manual method which displays the image, and also a manual method without an image display.

In one embodiment, the invention creates geo-referenced files which can be opened in most common geographic information system (GIS) software packages. More specifically, the invention creates a shapefile (*.shp & *.shx) and a Google Earth file (*.kmz) which contain the outlines of the areas from the image being processed with active fire in them. A shapefile is a geospatial vector data format for geographic information systems programs, and a Google Earth file is a virtual globe program that shows the earth by the superposition of images obtained from satellite imagery, serial photography, and GIS over a 3D globe. These types of files are typically very small compared to the size of the image file being processed.

The invention utilizes the information contained in multi-spectral imagery to classify pixels as 'fire' or 'non-fire'. The invention also has the ability to identify the approximate length, width, and area of the fires detected. These algorithms are designed to process multi-spectral electro-optical imagery.

In one embodiment, the present invention is an automatic fire detection and mapping software system. The system was constructed by utilizing open source software libraries. The open source libraries used to create the product were OSSIM (Open Source Software Image Map) and OpenCV (Open Source Computer Vision). The OSSIM libraries function as a means for the present invention to interact with satellite imagery and the metadata associated with the images. The OpenCV libraries contain many algorithms and functionalities that are useful for image processing.

Figure 3:
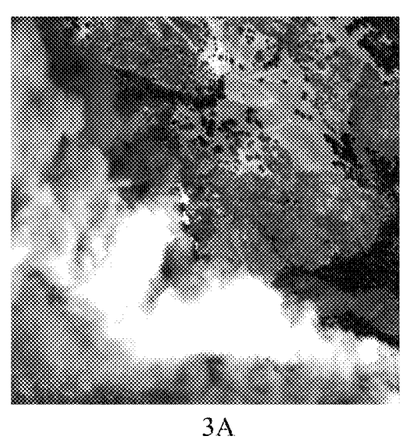
FIG. 3 shows layers of a multi-spectral image.

FIG. 3 shows layers of a multi-spectral image. A multi-spectral image can be thought of as one image that contains multiple grayscale images which only display radiation from specific regions of the electromagnetic spectrum. These images are also called bands of the image. A Quickbird multi-spectral image is composed of images from four regions of the electromagnetic (EM) spectrum and therefore has four bands. Quickbird is a high-resolution commercial earth observation satellite.

Other satellite sensors have their own regions of the electromagnetic (EM) spectrum which they are sensitive to. For a multi-spectral image each pixel location contains M values, where M is the number of bands in the image. The M values as a group is also called the spectra of the pixel. FIG. 3 shows a snippet of an image of a fire separated into its four component bands. In FIG. 3, clockwise from the upper-left corner, are images of the: red (FIG. 3A), blue (FIG. 3B), green (FIG. 3C), and near-infrared (NIR) bands (FIG. 3D). We can see that each image (band) looks slightly different and some of the images (bands) may contain more useful information than others, depending on the task at hand.

In the case of detecting fires, bands which display information from the infrared (IR) regions of the electromagnetic spectrum can be used to give an estimate of temperature. Some of the currently available commercial satellite imagers are sensitive only to the visible through NIR regions of the EM spectrum while others are sensitive to the visible through short-wave-infrared (SWIR) regions of the EM spectrum. Because of this, two separate algorithms have been developed. One algorithm has been developed for imagery which contains a SWIR band and another algorithm for imagery which only contains bands from the visible and NIR region of the EM spectrum.

Figure 8:
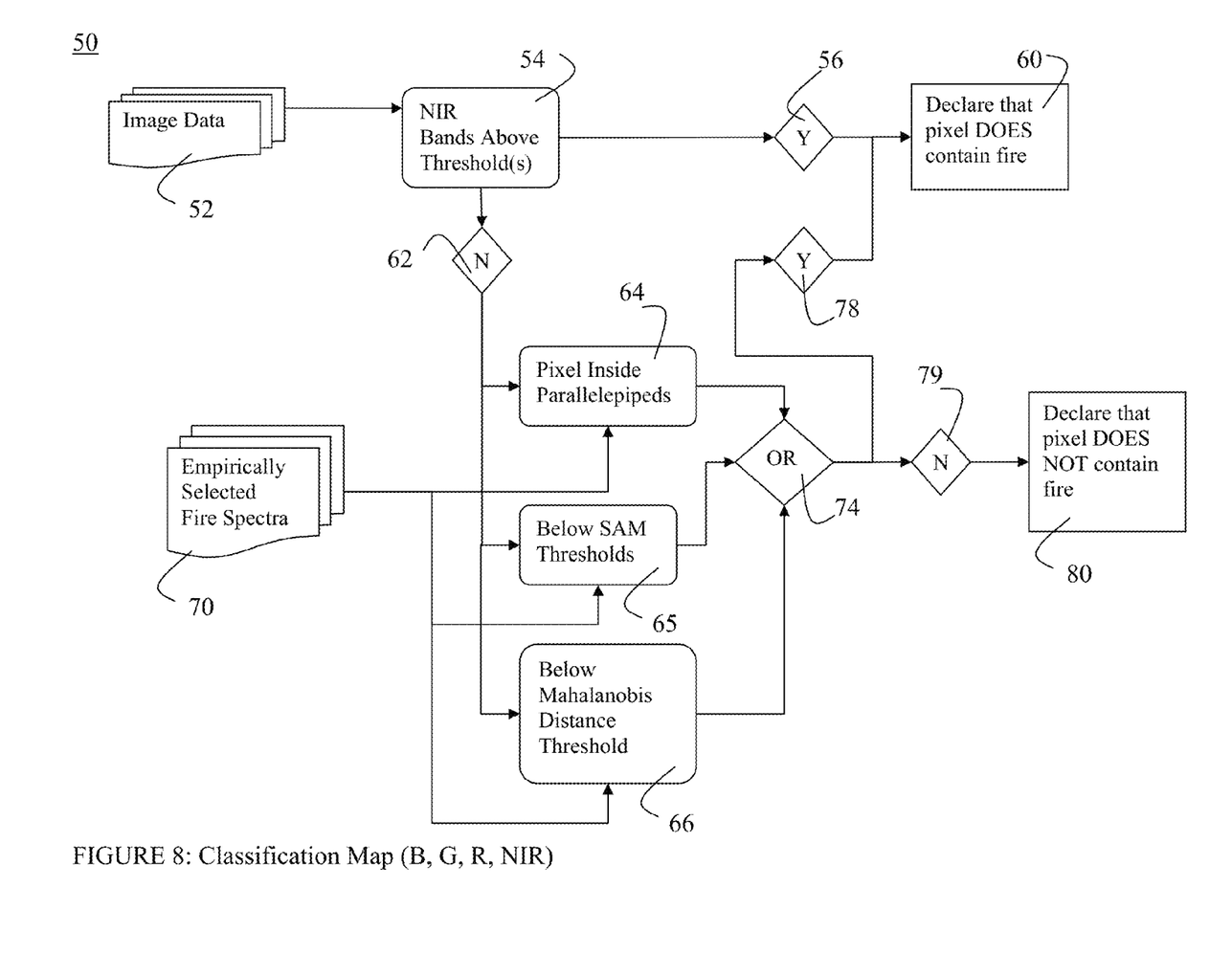
FIG. 8 shows a classification map flow chart of the algorithm used for imagery with bands in the visible and also near-infrared region of the electromagnetic spectrum.

The algorithm used for imagery which only contains bands from the visible and NIR regions of the EM spectrum will now be described. The first round of detection is done by individually classifying each pixel in the image. The first step of the algorithm shown in FIG. 8 is to threshold each pixel's thermal band (e.g. NIR (Near Infra-Red) for Quickbird) values by an absolute threshold which was set by experimentally choosing a level which gave a low (developer specified) false alarm rate for the set of test images on which the algorithms were developed (Quickbird is a high-resolution, electro-optical imaging earth observation satellite system).

The assumption has been made that these thresholds are sufficiently high enough to not cause false detection problems for objects that reflect IR radiation such as healthy vegetation. If the NIR bands meet the threshold requirements, these pixels are classified as containing fire. If the pixel doesn't meet the threshold requirements, then the algorithm moves to its next detection method.

When creating the algorithm there seemed to be three categories of spectra that corresponded with the type of fire that was observed (e.g. pixels taken from fires that were behind brown smoke all had similar spectra to each other). The algorithm described in this document used three different categories: (1) fire behind brown smoke, (2) fire behind white smoke, and (3) visible fire. For other types of imagery these categories may be different.

The next step in the algorithm compares each pixel with a library of reference pixels. The library contains pixels which represent fires behind brown smoke, fires behind white smoke, and also plainly visible red fires. Five separate tests are conducted on each pixel. After the tests are completed the pixel is declared as containing fire if any of the tests are positive. Some applications may require more or less tests to be done on the pixels before combining the results to achieve detection rates which are satisfactory to the user.

Figure 4:
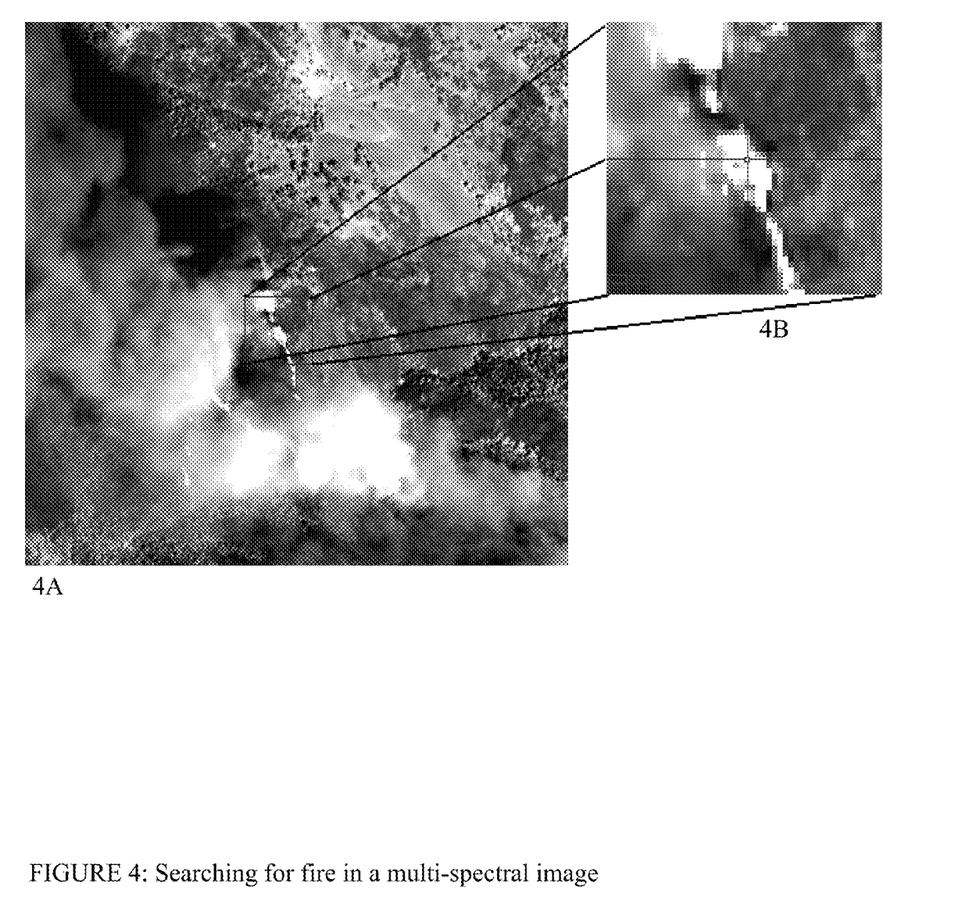
FIG. 4 shows a view of searching for fire in a multi-spectral image.

FIG. 4 shows a view of searching for fire in a multi-spectral image. To create a library of reference pixels one may open the multi-spectral image in an image viewer such as ENVI (which is a commercially available program for processing and analyzing geospatial imagery) and visually inspect the image for regions that appear to contain fire. FIGS. 4A and 4B show a region of a Quickbird image which appears to have fire in it along with a zoomed in view of the region. Once a region has been found that appears to have fire, the values of the pixels that appear to have fire need to be recorded.

Figure 5:
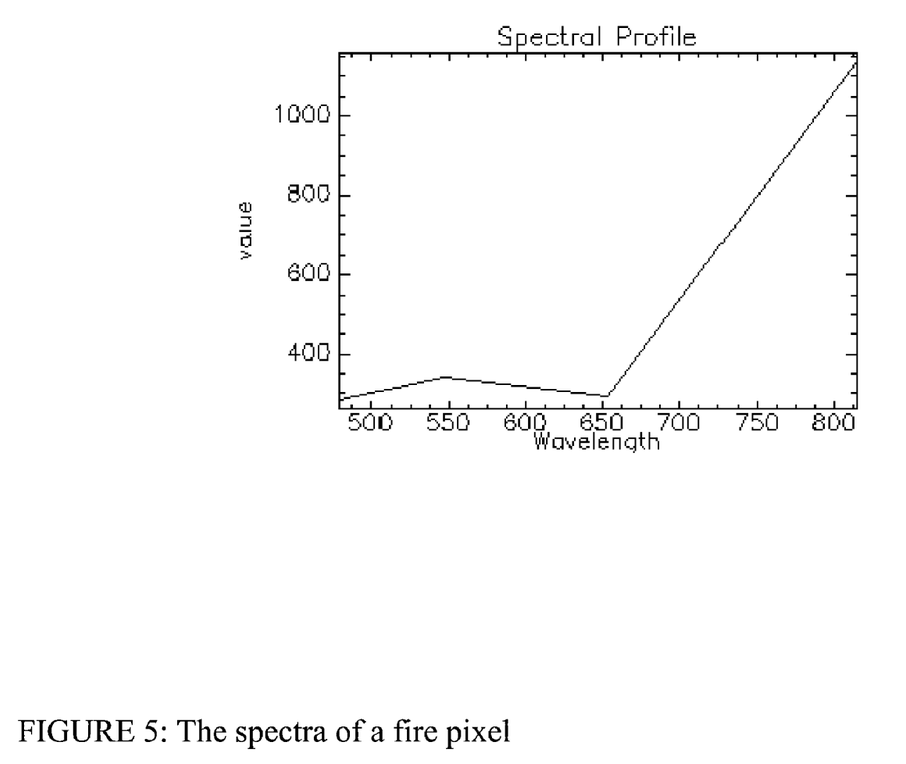
FIG. 5 shows the spectra of a fire pixel.

FIG. 5 shows the spectra of the fire pixel in the center of the zoomed in region from FIG. 4, where the Y-axis in FIG. 5 corresponds to the pixel value and the X-axis corresponds to the wavelength in nanometers (nm). ENVI has a region of interest tool which will save the spectra of pixels that the user selects. Any method of obtaining the value of each band for the pixels which contain fire is sufficient. It can be seen in FIG. 5 that the value of the pixel's spectra in the NIR region of the spectrum (~830 nm) is greater than the values corresponding to the visible region of the spectrum (<650 nm).

Figure 7:
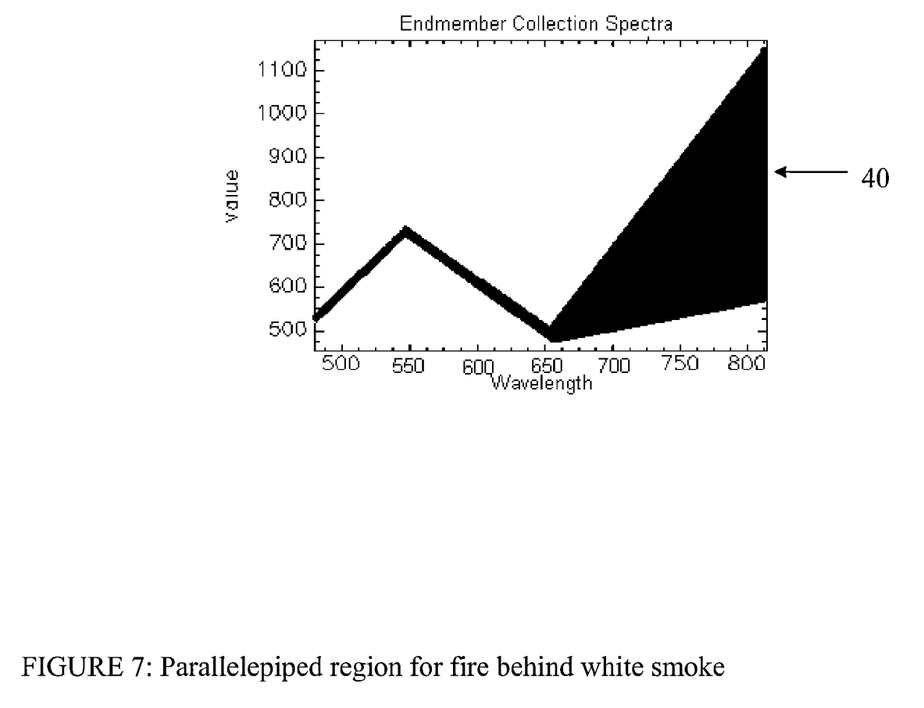
FIG. 7 shows a parallelepiped region for fire behind white smoke.

The first test for the pixel is to check whether or not it belongs to the parallelepiped region corresponding to fire behind white smoke (FIG. 7). In the second test the pixel is also checked to see whether it belongs to the parallelepiped region corresponding to fire behind brown smoke.

Figure 6:
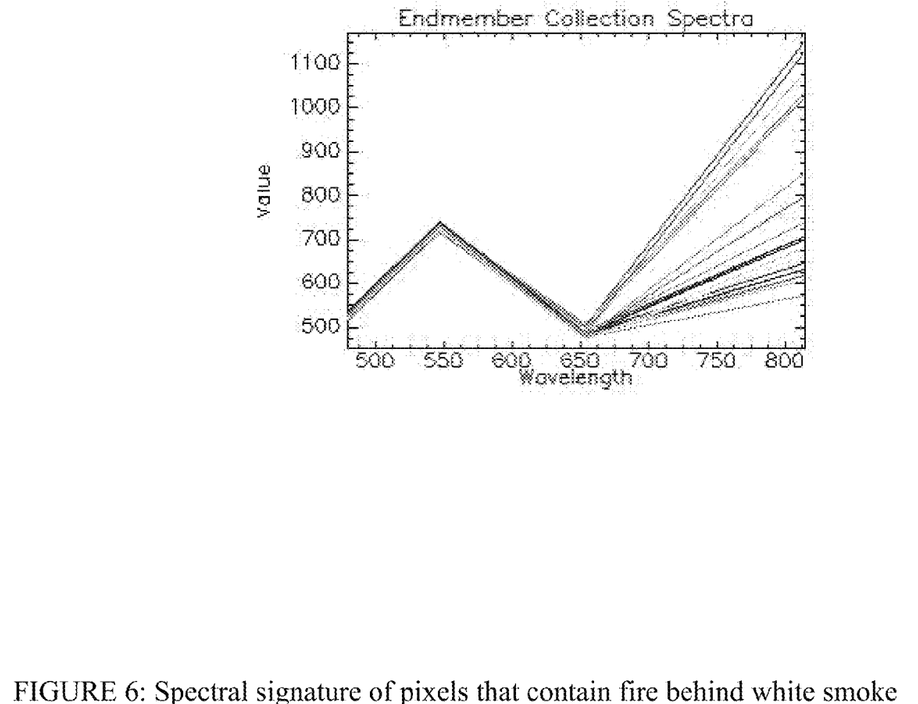
FIG. 6 shows spectral signature of pixels that contain fire behind white smoke.

FIG. 6 shows the spectral signature of pixels that contain fire behind white smoke and FIG. 7 shows a parallelepiped region 40 for fire behind white smoke. In FIG. 6, the value of the pixels in the NIR regions of the spectrum (~830 nm) is also greater than the values corresponding to the visible regions of the spectrum (<650 nm).

The parallelepiped regions 40 in FIG. 7 were defined by selecting pixels in the test dataset that were believed to have contained fire behind smoke. For each color of smoke (i.e. brown or white smoke) the maximum and minimum values for each band of the collection of pixels was recorded. The spectra of the pixels which contained fire behind white smoke that were used to calculate the parallelepiped referred to above can be viewed in FIG. 6. The parallelepiped region for pixels that contain fire behind white smoke is shown in FIG. 7 as the black region 40.

The algorithm considers any pixel with spectra that can be drawn within the black region 40 of FIG. 7 as belonging to the parallelepiped region corresponding with fire behind white smoke. Similar figures could be created for the fires behind other colors of smoke.

The third and fourth tests are both variants of the spectral angle mapper (SAM) method of binary classification. The angle between the pixel being tested and a reference pixel from the library is computed by the following formula:

$$\theta = \arccos\left(\frac{a \cdot b}{|a||b|}\right).$$

Where a represents the pixel being tested, and b represents the reference pixel from the library. The reference pixels used in the third and fourth tests are pixels representing visible fire and fire behind brown smoke respectively. Instead of only using the angle between the vectors, as is done in standard SAM classification, the ratio of the magnitudes of the pixel and the reference pixel is also calculated. For the pixel to pass the third and/or fourth test(s) the angle between it and the reference pixel must be less than 0.08 radians and also have a magnitude which is at least 90% and/or 95% of the reference pixel magnitude respectively.

The fifth test that each pixel is subjected to calculates the Mahalanobis distance between the pixel and a pixel representing fire behind white smoke by using the equation below:

$$D_M(x) = \sqrt{(x-\mu)^T S^{-1}(x-\mu)}.$$

where μ is the pixel representing fire behind white smoke and S is the covariance matrix of the set of pixels that contained fire behind white smoke in the test dataset that the algorithms were developed on. The flow chart of the classification map method used by the invention is shown in FIG. 8 for the B, G, R, and NIR bands.

Referring again to FIG. 8, the flowchart illustrating the sequence of steps for the method 50 of the present invention will now be described in more detail. In FIG. 8, the received image data 52 is compared to the NIR Bands Above Threshold step 54. If the comparison test determines that the received pixels are above the threshold, at step 56, the pixels are classified as containing fire, and a declaration that the pixel does contain fire is made at step 60

If no declaration is made, at step 62, the method 50 proceeds to the next detection tests, which includes the Pixel Inside Parallelepipeds test 64, the Below SAM Thresholds test 65, and the Below Mahalanobis test 66, all shown in FIG. 8.

As described above, the method 50 compares each received pixel image data with a library of reference pixels, which is the Empirically Selected Fire Spectra box 70 shown in FIG. 8.

As shown in FIG. 8, the method 50 of the present invention automatically declares that the received pixels 52 do contain fire if any one of the process tests 64, 65, 66 are met, as shown by the OR gate 74 and "yes" step 78, with a declaration that the pixel does contain fire at step 60. Otherwise, the method 50 automatically declares at steps 79, 80 that the received pixels do not contain fire. At this point, all of the image pixels have been classified for this image and this binary image is ready to be processed to create the outputs of the system. Before proceeding to discuss how the outputs are created from the binary classification image, the algorithm for imagery which contains a SWIR band will be described below.

Figure 9:
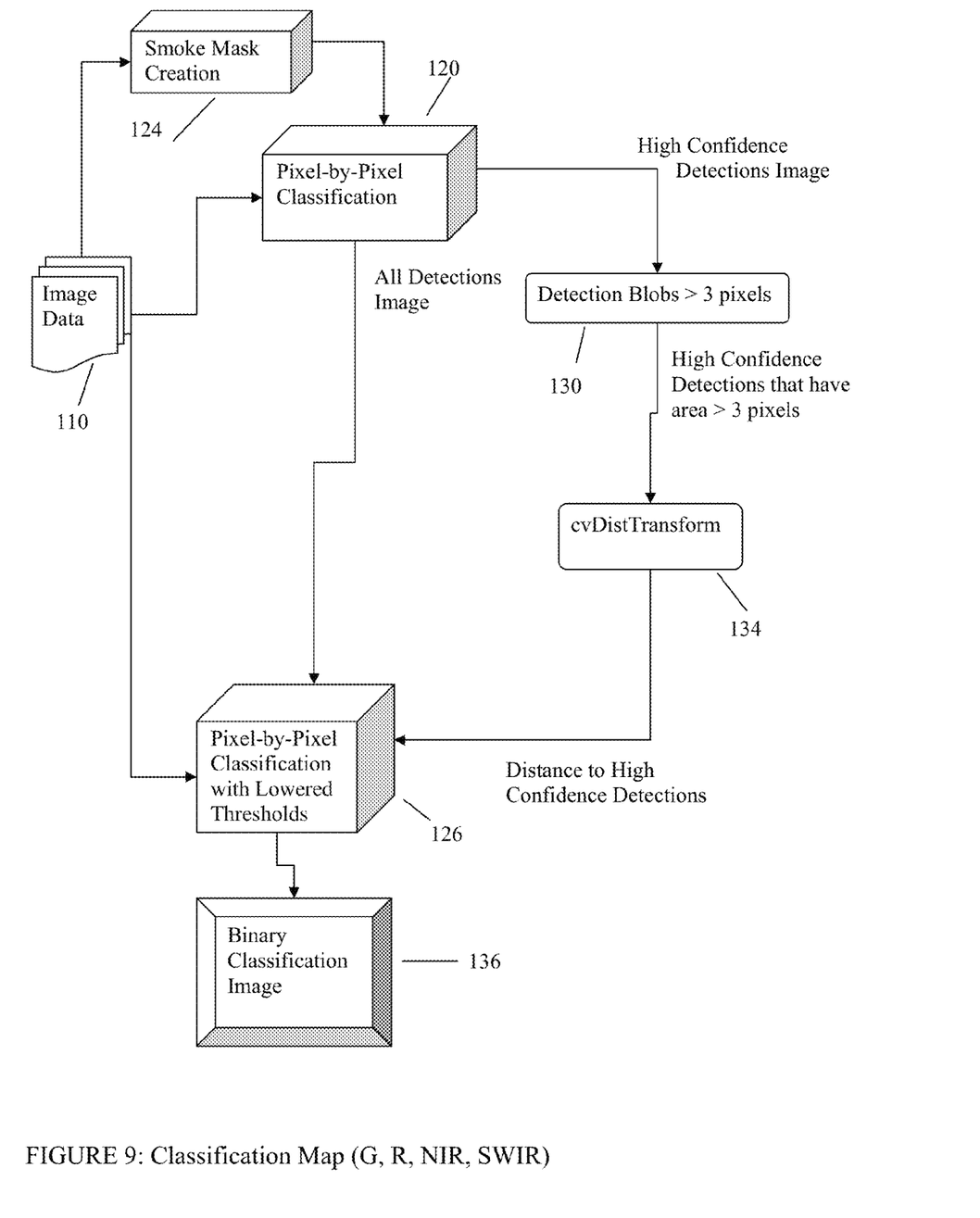
FIG. 9 shows a top level classification map flow chart of the algorithm used for imagery with bands in the visible, near-infrared, and also short-wave-infrared region of the electromagnetic spectrum.

FIG. 9 shows a classification map for the processing algorithm for the G, R, NIR and SWIR bands. In FIG. 9, Image data 110 is input to Pixel-by-Pixel Classification block 120 (shown in more detail in FIG. 10), Pixel-by-Pixel Classification with Lowered Thresholds block 126 (shown in more detail in FIG. 11) and Smoke Mask Creation block 124 (shown in more detail in FIG. 12).

In FIG. 9, the output of Classification block 120 is input to Detection Blobs >3 pixels block 130 and Lowered Thresholds block 126; the output of Detection Blobs block 130 is an input to evDistTransform block 134, which has an output to Lowered Thresholds block 126. The output of Lowered Thresholds block is an input to Binary Classification Image block 136 in FIG. 9.

As can be seen in the classification map for the G, R, NIR and SWIR bands shown in FIG. 9, this algorithm processes the image twice. An initial pixel-by-pixel classification is done on the image to create two separate binary images. One of the binary images is 'true' for pixels which are believed to contain fire, and 'false' for pixels which are not. The other binary image created by this initial pixel-by-pixel classification has 'true' values only for pixels which the algorithm is highly confident that contain fire, and 'false' for pixels which do not. This binary image of detections that the algorithm is confident in is processed using the cvBlobsLib library to only allow blobs with greater than 3 pixels to remain (block 130).

The image is further processed using the OpenCV function cvDistTransform at block 134 to create an image which at every pixel location contains the distance to the nearest pixel which the algorithm classified as a confident detection (in units of pixels). This image is used to reprocess the original image near these confident detections with relaxed (lowered) thresholds to allow for the detection of more fires. After this processing of the image with relaxed or lowered thresholds, we are left with a binary classification image at block 136 depicting which pixels are believed to have (or not have) fire.

Figure 10:
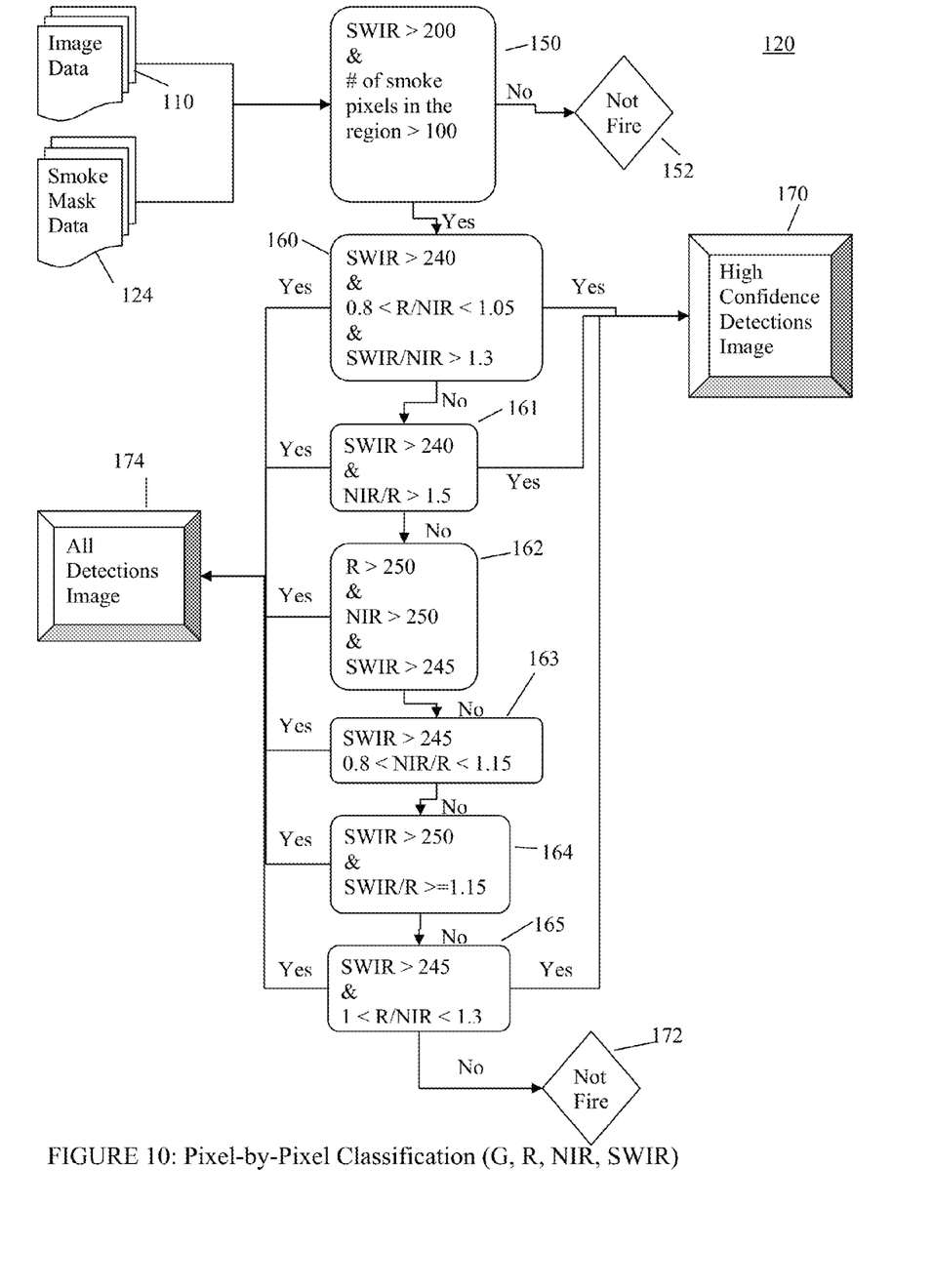
FIG. 10 shows the classification map contained in the "Pixel-by-Pixel Classification" block of FIG. 9
Figure 11:
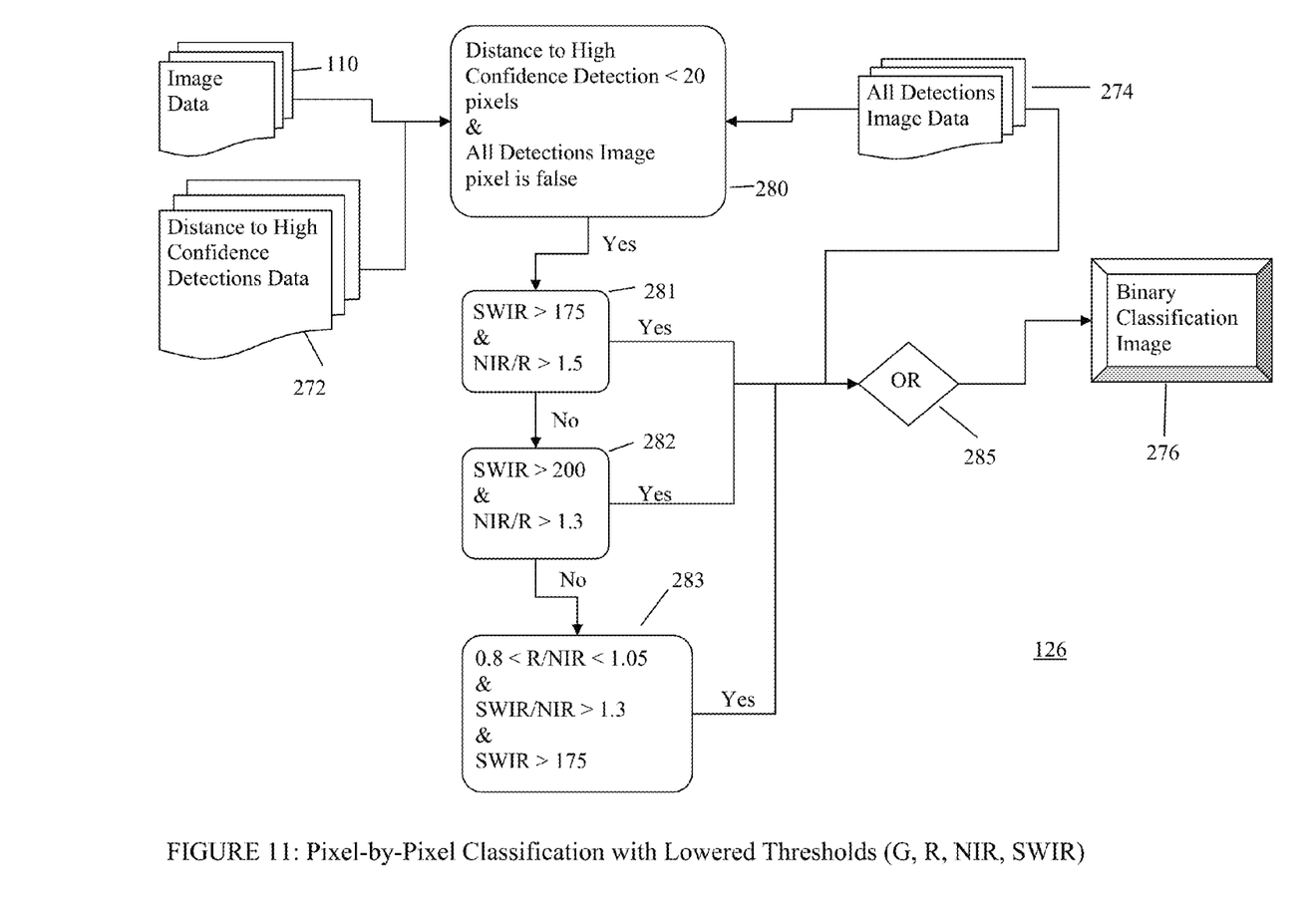
FIG. 11 shows the classification map contained in the "Pixel-by-Pixel Classification with Lowered Thresholds" block of FIG. 9
Figure 12:
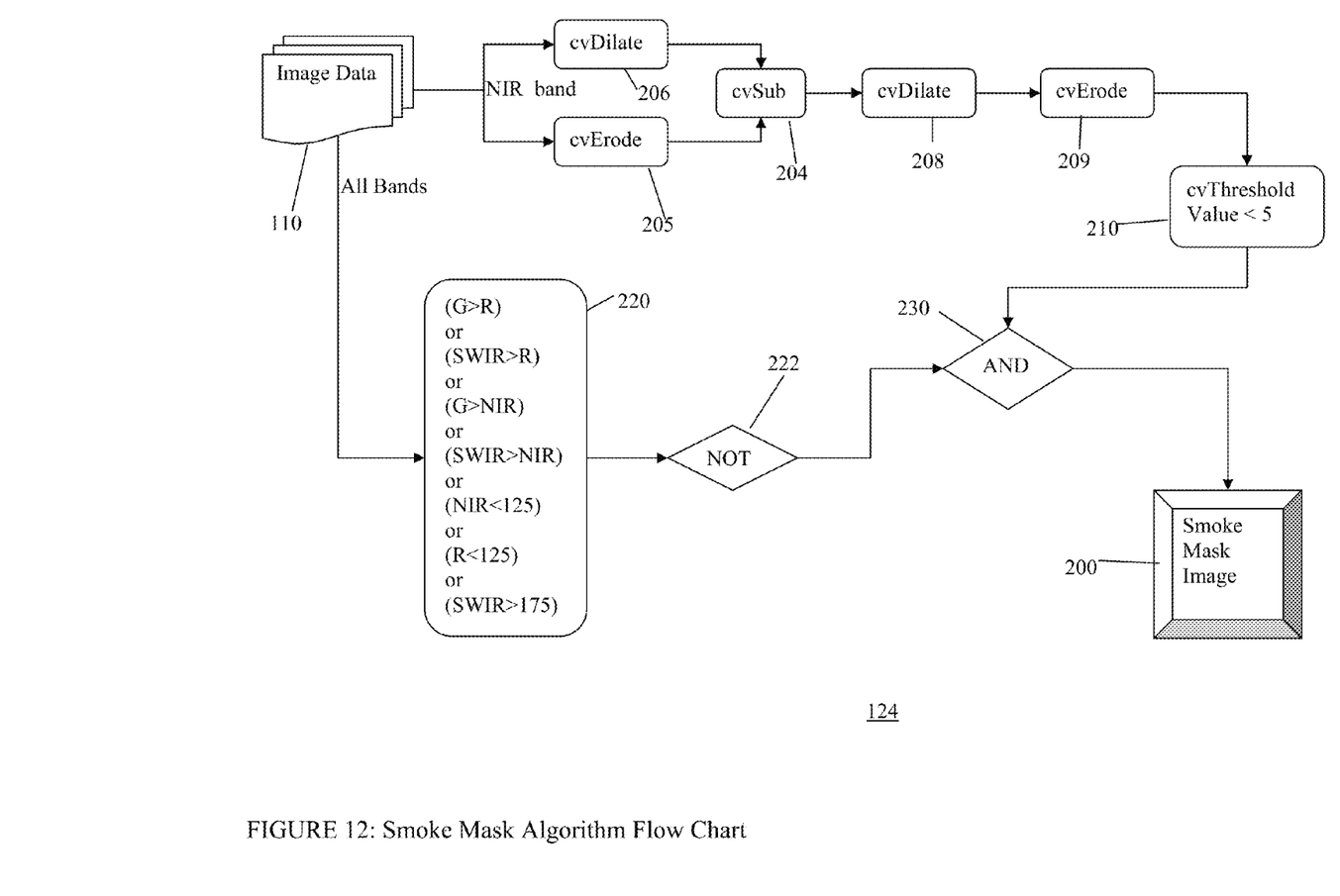
FIG. 12 shows a graphical depiction of the algorithm used to create a smoke mask for imagery with a SWIR band.

The pixel-by-pixel classification algorithm for the G, R, NIR and SWIR bands is depicted in FIG. 10. The algorithm which produces a smoke mask which is used an input to the pixel-by-pixel classification of FIG. 10 is depicted in FIG. 12. The pixel-by-pixel classification algorithm with lowered thresholds for the G, R, NIR and SWIR bands is depicted in FIG. 11. A description of these algorithms follows below.

The pixel-by-pixel classification algorithm 120 depicted in FIG. 10 has two inputs which are the image data 110, and the smoke mask 124. The first step of this algorithm is to check that the SWIR band of the pixel is above a threshold and also that there is smoke in the region surrounding the pixel, as shown at block 150. If this threshold is not met the algorithm will declare the pixel as non-fire at step 152 and move on to the next pixel. The next steps of the algorithm include comparing the bands, and ratios of the bands, of each pixel with certain thresholds, as shown at blocks 160-165.

There are three tests which, if true, classify the pixel as a high confidence detection and sets the value at the pixel location of the High Confidence Detections Image block 170 and also the All Detections Image block 174 to true. The remaining tests mark the pixel as true only in the All Detections Image block 174. All pixels not marked as true by the algorithm are marked as false in the output images at step 172. The thresholds shown in blocks 160-165 were selected because they gave adequate performance for the database of images this algorithm was developed on.

The algorithm for creating a smoke mask 124 used in the pixel-by-pixel classification described above is depicted in FIG. 12. This algorithm has the image data 110 as an input and a binary smoke mask image 200 as an output. The smoke mask 124 is created by using the morphological operations of dilation and erosion. For a grayscale image, the dilation operation returns the maximum gray-level of the 8-neighborhood of each pixel. Conversely, the erosion operation returns the minimum gray-level of the 8-neighborhood of each pixel.

The first step of the algorithm is to subtract (block 204) the results of an erosion of the NIR band image (block 205) from the results of a dilation of the NIR band image (block 206). This will result in an image that contains the range of values in the 8-neighborhood of each pixel. The algorithm then performs a closing operation by dilating (block 208) and eroding (block 209) the image. After closing, each pixel in the image is compared against a threshold (block 210). Pixels which have a value below the threshold of five are left as candidates for being smoke pixels.

Next, a series of comparisons of the pixels bands are performed at block 220 to throw out pixels which do not appear to be smoke. The results of these comparisons from gate 222 are taken together at AND gate 230 with the results of the threshold at block 210 described above. For a pixel to be classified as a smoke pixel it must have not been thrown out in either of the steps. All other pixels are classified as not being a smoke pixel.

The algorithm for pixel-by-pixel classification with lowered thresholds 126 is depicted in FIG. 11. This algorithm has three inputs: (1) the Image Data 110, (2) the Distance to High Confidence Detections for each pixel 272, (3) the All Detections Image data 274. The output of this algorithm is the final binary classification image 276 which classifies each pixel by whether or not it appears to contain fire. The algorithm proceeds by processing only those pixels which are within 20 pixels from a high confidence detection and also were not previously marked as fire in the All Detections Image 274.

A series of comparisons are then performed on the bands and ratios of bands of the remaining pixels, as shown at blocks 280-283 in FIG. 11. The final binary classification image 276 for this algorithm will denote a pixel as a fire pixel if any of these comparisons are true or (block 285) if the All Detections Image 274 had a true value at that pixel location. This concludes the description of the classification algorithm specific to imagery which contains a SWIR band. The method of creating the outputs from the binary classification image are described below.

Figures 13, 14:
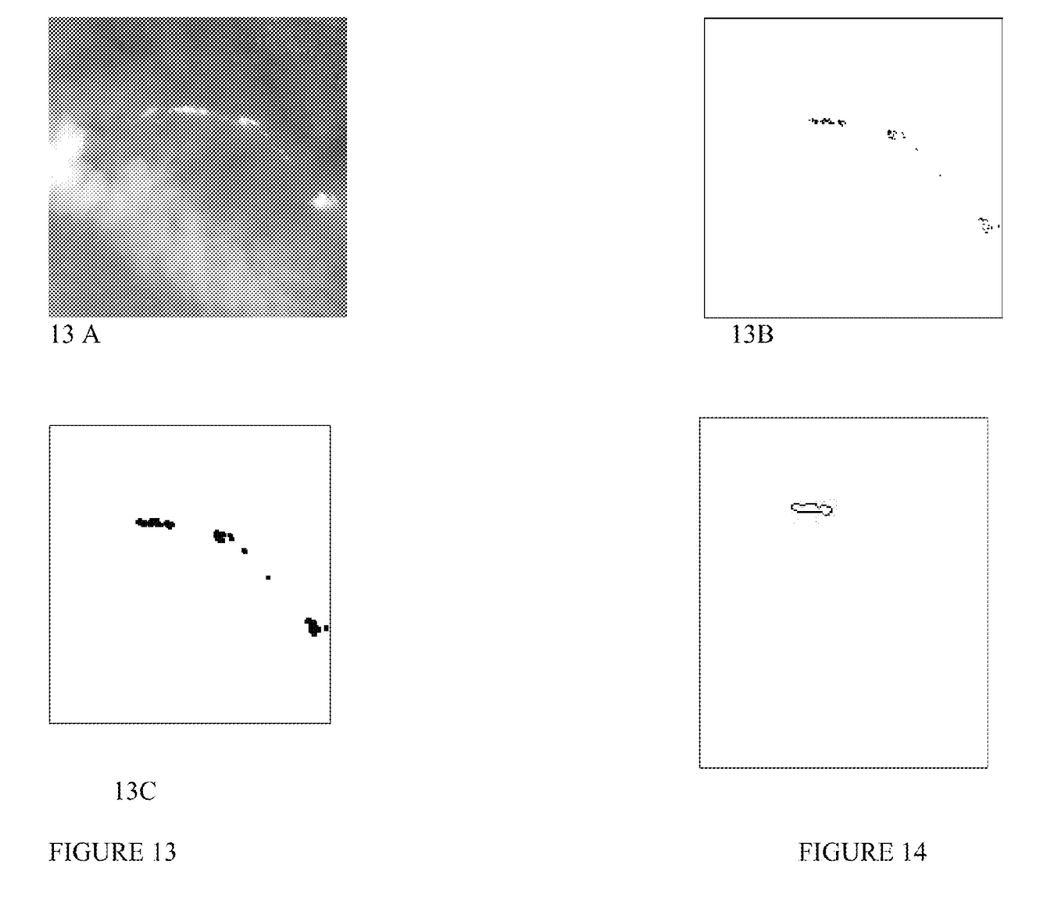
FIG. 13 shows a binary mask (a) original image (grayscale) (b) binary mask before dilation/erosion (c) binary mask after dilation/erosion.
FIG. 14 shows a blob contour image.

After the image pixels have been classified, we are left with a binary mask. As shown in FIG. 13(A), the original image is in grayscale. The mask is then dilated and eroded to close small holes in the mask. The mask is then dilated once more to ensure that the contours of the mask are created correctly. Typical results of this process can be seen in FIG. 13, which shows (13A) an original image (grayscale); (13B) binary mask before dilation/erosion; and (13C) binary mask after dilation/erosion.

Now the mask is ready to be processed to extract the contours of the detections. To do this, the mask is first processed using the cvBlobsLib library. After processing, each region in the mask with groups of pixels that are touching are grouped together to constitute a single detection for that region and these groups are called blobs. Each blob is then processed by the openCV function cvFindContours to obtain the outlines of the blobs. The results of this processing for the upper-leftmost blob from FIG. 13(C) can be seen in FIG. 14, which shows a blob contour image At this point we have contours of all of the blobs of detections found in the image. These contours describe curves in the image coordinate space (i.e. pixel locations). To translate the curves to be described in the world coordinate space (i.e. latitudes and longitudes) the OSSIM function "lineSampleToWorld" is used. These contours in the world coordinate space are then passed to functions which create the inventions output files (i.e. shapefiles and Google Earth files).

The present invention has several advantages over methods that are currently available. One of the key advantages of using this automated method of fire detection versus having an analyst process the imagery is speed. The present invention takes time on the order of seconds to process an image and create the GIS output files, which can be a significant advantage over the amount of time that it may take a trained image analyst to complete the same task.

The next advantage that the present invention has over the currently available technology is the resolution at which it can map the regions of fire. The current automated methods such as MODIS have resolutions 50 to 100's of times worse than can be achieved with this invention. The actual resolution advantage depends on the sensor being used to acquire the image that is to be analyzed.

Another important advantage is that the sizes of the files created by this invention are generally very small compared to the size of the image file being processed. This provides an advantage over the methods which produce full size images as output of their processing. These smaller output files will require much less bandwidth to be transmitted to their destinations.

The present invention can automatically detect and map fires detected in multi-spectral EO/IR overhead imagery. With future improvements in satellite sensors, this invention can be improved to provide more accurate results. This invention can be built upon to include the detection and mapping of many other objects of interest. As the spectral resolution of satellite sensors becomes finer the multi-spectral imagery that they produce can be used to uniquely identify many objects with high confidence.

High resolution, large footprint satellite imagery with potential fire disaster areas can be processed and have their results automatically mapped to a virtual globe program such as Google Earth. As an example, a fire map according to the present invention can be created using commercial satellite imagery with a simple KML file (Keyhole Markup Language) overlaid on Google Earth, which allows a user to quickly determine the location of critical infrastructures, such as houses, schools, major roads and the like, which might be in the possible path of a detected fire.

From the above description, it is apparent that various techniques may be used for implementing the concepts of the present invention without departing from its scope. For instance, insurance companies may find the feed useful for risk analysis or investigation of claims. First responders may find the invention helpful in their efforts to assess wildfire situations. Satellite companies may be interested in using this invention to process their imagery to create a high resolution fire feed which may be able to be sold. News companies may be interested in using the Google Earth files in their coverage of wildfire events. The described embodiments are to be considered in all respects as illustrative and not restrictive. It should also be understood that is not limited to the particular embodiments described herein, but is capable of many embodiments without departing from the scope of the claims.

What is claimed is:

1. An automated fire detection and mapping method comprising:
   receiving selected multi-spectral satellite images including pixels in each image having wavelength bands selected from the group of B, G, R, NIR and SWIR bands;
   comparing the selected bands of each pixel with a predetermined threshold representative of a low false alarm rate for a set of pixel test images; and
   determining that a fire is detected if the predetermined threshold comparison is met wherein the selected bands includes the B, G, R and NIR bands or G, R, NIR and SWIR bands.

2. The method of claim 1 further comprising
   comparing each pixel in the received images with a library of predetermined reference pixels where the reference pixels represent fires behind brown smoke, fires behind white smoke, and plainly visible red fires and determining that a fire is detected if the comparison is met.

3. The method of claim 2 further comprising
   comparing whether a received pixel is inside a test parallelepiped region representative of fire behind smoke where the test parallelepiped region has a set of spectral signatures of pixels which have fire behind white smoke;
   comparing whether a received pixel is inside a test parallelepiped region representative of fire behind smoke where the test parallelepiped region has a set of spectral signatures of pixels which have fire behind brown smoke;
   comparing the received pixel with a spectral angle mapper (SAM) where the angle between each received pixel and a reference pixel that represents visible fire and fire behind brown smoke, respectively.

4. The method of claim 3 where the angle is less than 0.08 radians and has a magnitude which is at least 90% or 95% relative to the reference pixel, respectively.

5. The method of claim 4 further comprising
   calculating the Mahalanobis distance between each received pixel and a reference pixel representing fire behind white smoke.

6. The method of claim 1 further comprising a pixel by pixel classification step for processing smoke mask data and image data to form a binary classification image representative of a detected fire image by creating two separate binary images, the first of which represents whether detections contain fire and the second of which represents detections of fire only for high confidence.

7. The method of claim 1 further comprising
   forming classified pixels in a binary mask representing detected fire.

8. The method of claim 7 further comprising
   morphologically dilating and eroding the mask to close holes in the binary mask.

9. The method of claim 8 further comprising
   extracting blob regions of touching pixels from the binary mask and extracting their contours.

10. The method of claim 9 further comprising
    processing the contours to convert their pixel locations to world coordinates of latitudes and longitudes.

11. The method of claim 10 further comprising
    providing a file which contains outlines of areas with detected active fires.

12. An automated fire detection and mapping method comprising:
    receiving high resolution multi-spectral satellite images including pixels in each image having wavelength bands which include NIR and/or SWIR bands;
    comparing the NIR and/or SWIR bands of each pixel with a predetermined threshold representative of a low false alarm rate for a set of pixel test images;
    determining that a fire is detected if the predetermined threshold comparison is met; and
    providing a shapefile and a global program file which contains outlines of areas with detected active fires.

13. An automated fire detection and mapping method comprising:
    receiving selected high resolution multi-spectral satellite images including pixels in each image having wavelength bands selected from the group of B, G, R, NIR and SWIR bands;
    processing the selected multi-spectral satellite images including pixels in each image having wavelength bands which include the NIR and/or SWIR bands, including the steps of:
    comparing the NIR and/or SWIR bands of each pixel with a predetermined threshold representative of a low false alarm rate for a set of pixel test images;
    determining that a fire is detected if the predetermined threshold comparison is met; and
    providing a shapefile and a global program file which contains outlines of areas with detected active fires.

* * * * *